(12) United States Patent
Wiik

(10) Patent No.: US 6,619,275 B2
(45) Date of Patent: Sep. 16, 2003

(54) INTERNAL COMBUSTION ENGINE

(75) Inventor: Jan-Erik Wiik, Kungsbacka (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 09/682,080

(22) Filed: Jul. 17, 2001

(65) Prior Publication Data
US 2003/0015181 A1 Jan. 23, 2003

(30) Foreign Application Priority Data
Jul. 7, 2000 (SE) .............................................. 0002583

(51) Int. Cl.$^7$ ................................................ F02B 33/00
(52) U.S. Cl. ..................... 123/559.1; 123/563
(58) Field of Search ............................ 123/559.1, 563, 123/195 R; 60/605.1; 164/235; 165/74, 75, 158

(56) References Cited

U.S. PATENT DOCUMENTS

| 3,881,455 | A | * | 5/1975 | Belsanti ........................ 123/563 |
|---|---|---|---|---|
| 4,237,847 | A | * | 12/1980 | Baugh et al. ............. 123/195 R |
| 4,385,594 | A | * | 5/1983 | Hauser, Jr. ................... 123/563 |
| 4,474,007 | A | * | 10/1984 | Kronogard et al. ......... 60/605.1 |
| 4,565,177 | A | * | 1/1986 | Roettgen et al. ............. 123/563 |
| 5,085,199 | A | * | 2/1992 | Sado et al. ............... 123/559.1 |
| 5,121,787 | A | * | 6/1992 | Corbett ........................ 164/235 |
| 6,029,637 | A | * | 2/2000 | Prior ........................ 123/559.1 |
| 6,079,394 | A | * | 6/2000 | Abthoff et al. ........... 123/559.1 |
| 6,227,179 | B1 | * | 5/2001 | Eiermann et al. ............ 123/563 |
| 6,308,680 | B1 | * | 10/2001 | Prior ....................... 123/195 R |

* cited by examiner

Primary Examiner—Thomas Denion
Assistant Examiner—Thai Ba Trieu
(74) Attorney, Agent, or Firm—Howrey Simon Arnold & White LLP

(57) ABSTRACT

An internal combustion engine with a mechanically driven charge-air compressor, which is connected to the engine intake manifold by way of an intercooler, is disclosed. The characteristic feature of the engine is that the compressor, the intercooler and the intake manifold have a common, integrally cast housing part.

10 Claims, 5 Drawing Sheets

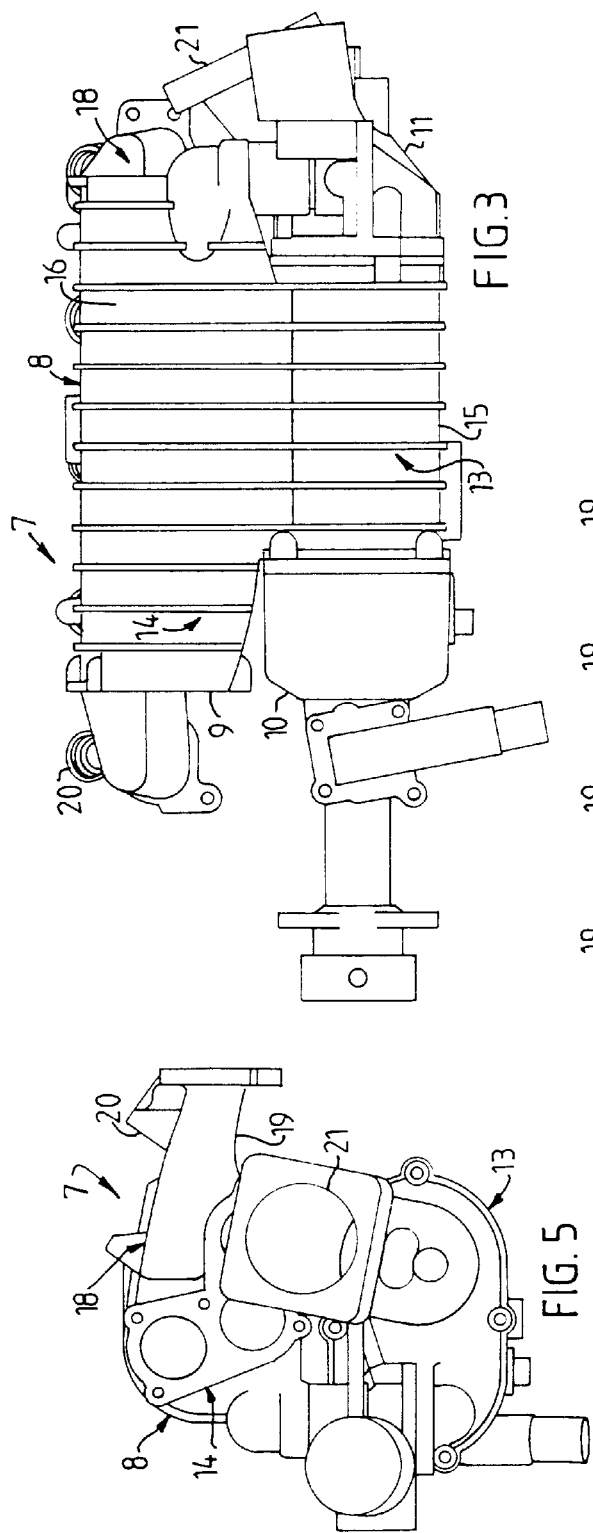

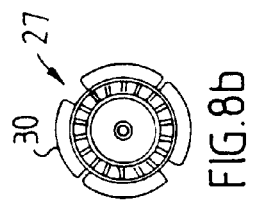
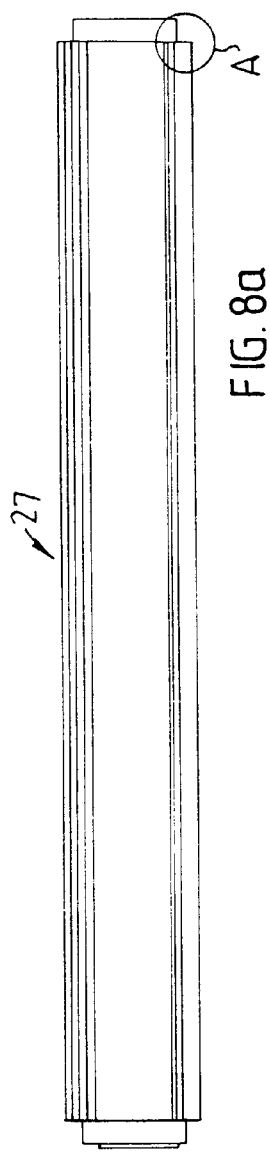
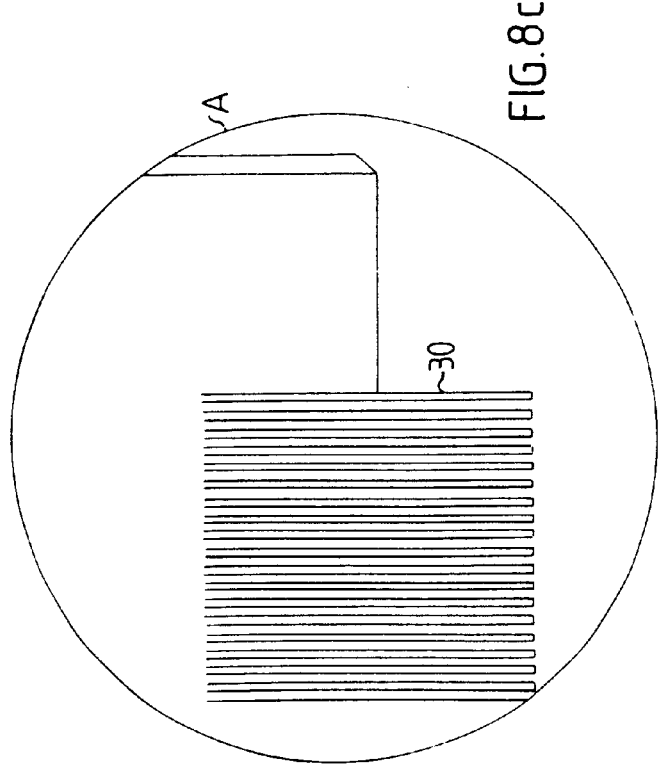
FIG. 8a
FIG. 8b
FIG. 8c

INTERNAL COMBUSTION ENGINE

BACKGROUND OF INVENTION

1. Technical Field

The present invention relates to an internal combustion engine comprising an engine block with a plurality of cylinders, a cylinder head connected to the engine block with combustion air inlet ports to each cylinder, an intake manifold with at least one branch pipe to each cylinder and a mechanically driven compressor that is connected to the intake manifold by way of an intercooler.

2. Background Information

Supercharged engines with charge-air cooling usually have a radiator in the form of a plate heat exchanger mounted in the engine compartment at a distance from the engine. The heat exchanger is connected by way of pipes and/or hoses to the compressor outlet and the intake manifold inlet. This means that the volume of air between the compressor outlet and the intake manifold inlet is relatively large. When a mechanically driven compressor, such as a screw compressor, is used a great amount of noise tends to be generated due to resonance in the system. Further, this large volume of air between the compressor outlet and the inlet to the engine cylinders also has a negative effect on engine response.

SUMMARY OF INVENTION

The object of the present invention is to produce a supercharged internal combustion engine having a very compact compressor and intercooler installation, resulting in more efficient cooling and silencing and improved response than previously known supercharged engines with charge-air cooling described above.

According to the invention this is achieved by having a common, integrally formed housing part connected to the intake manifold for the compressor and the intercooler.

In a preferred embodiment the intake manifold is also integrally formed with the housing part of the compressor and the intercooler. The housing part is preferably composed of a cast metal such as aluminum.

By integrating the compressor, intercooler and intake manifold in this way, a very compact and stable unit is provided with very small air volume between the compressor outlet and the inlet into the cylinders of the engine. For example, the volume of air may be as little as 2.5 liters in an engine of corresponding cylinder capacity.

BRIEF DESCRIPTION OF DRAWINGS

The invention is described in more detail below with reference to exemplary embodiments shown in attached drawings, in which:

FIG. 3 shows a side perspective view of the engine's integrated compressor, intercooler and intake manifold unit;

FIG. 4 shows the unit in FIG. 3 rotated 90 degrees;

FIG. 5 shows an end perspective view of the unit in FIG. 3 viewed from the right end of FIG. 3;

FIG. 8a shows a side view of a cooler element;

FIG. 8b shows an end view of the cooler element in FIG. 8a;

FIG. 8c is an enlarged view of the area inside the circle A in FIG. 8a; and

DETAILED DESCRIPTION

Figure 1:
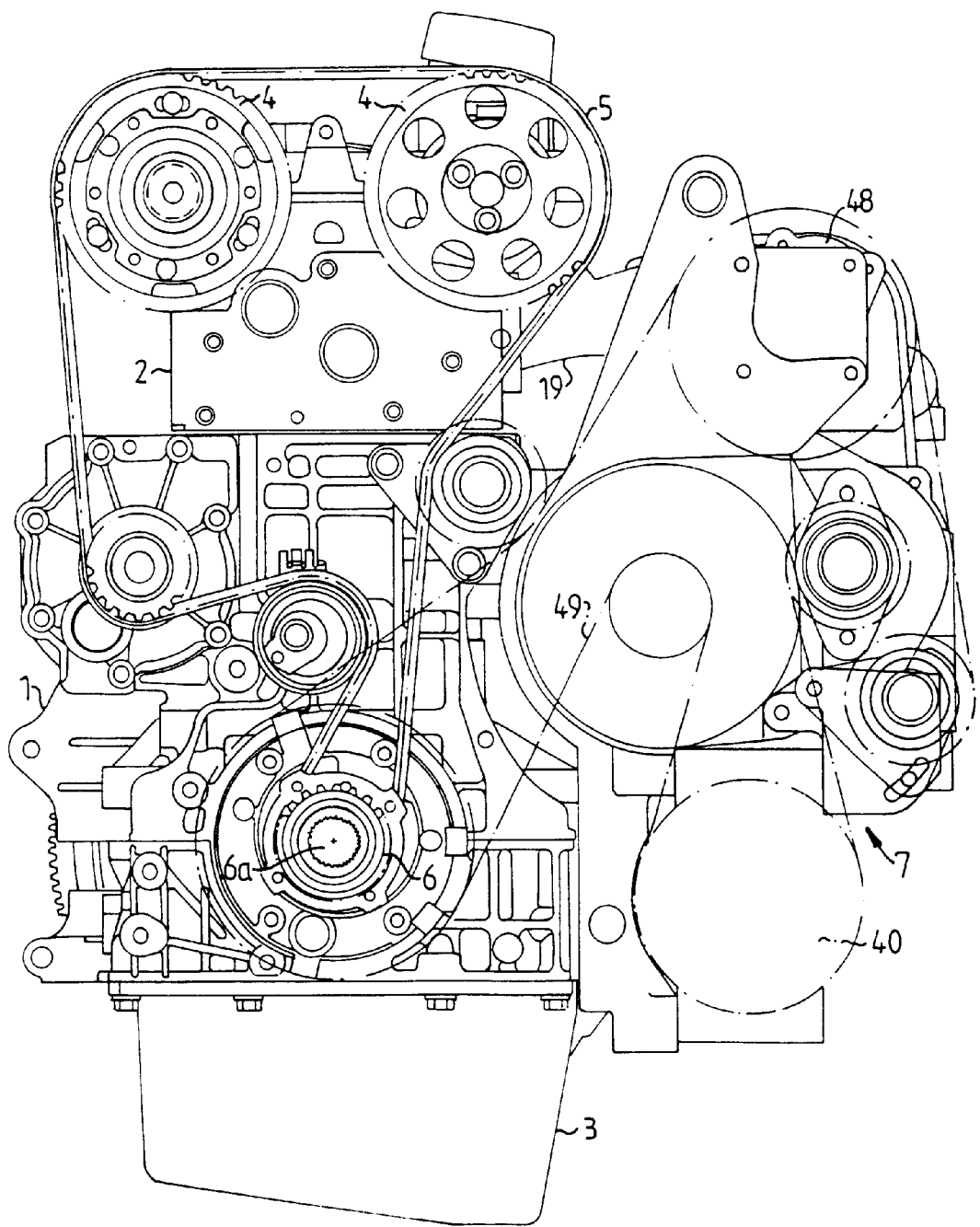
FIG. 1 shows an end perspective view of an embodiment of a multi-cylinder, in-line engine.

In FIG. 1, 1 denotes the cylinder block, 2 the cylinder head and 3 the oil pan of a multi-cylinder in-line engine having fuel injection as known in the art. The engine has twin overhead camshafts supporting gears or pinions 4. A common toothed belt 5 drives these pinions 4 from a pinion 6 on the engine crankshaft 6a. An integrated compressor, inter-cooler and intake manifold unit, generally denoted by 7, is shown on the right-hand side of the cylinder block 1 and the cylinder head 2 in FIG. 1. This integrated unit 7 will be described in more detail below, with particular reference to FIGS. 3–7.

Figure 6:
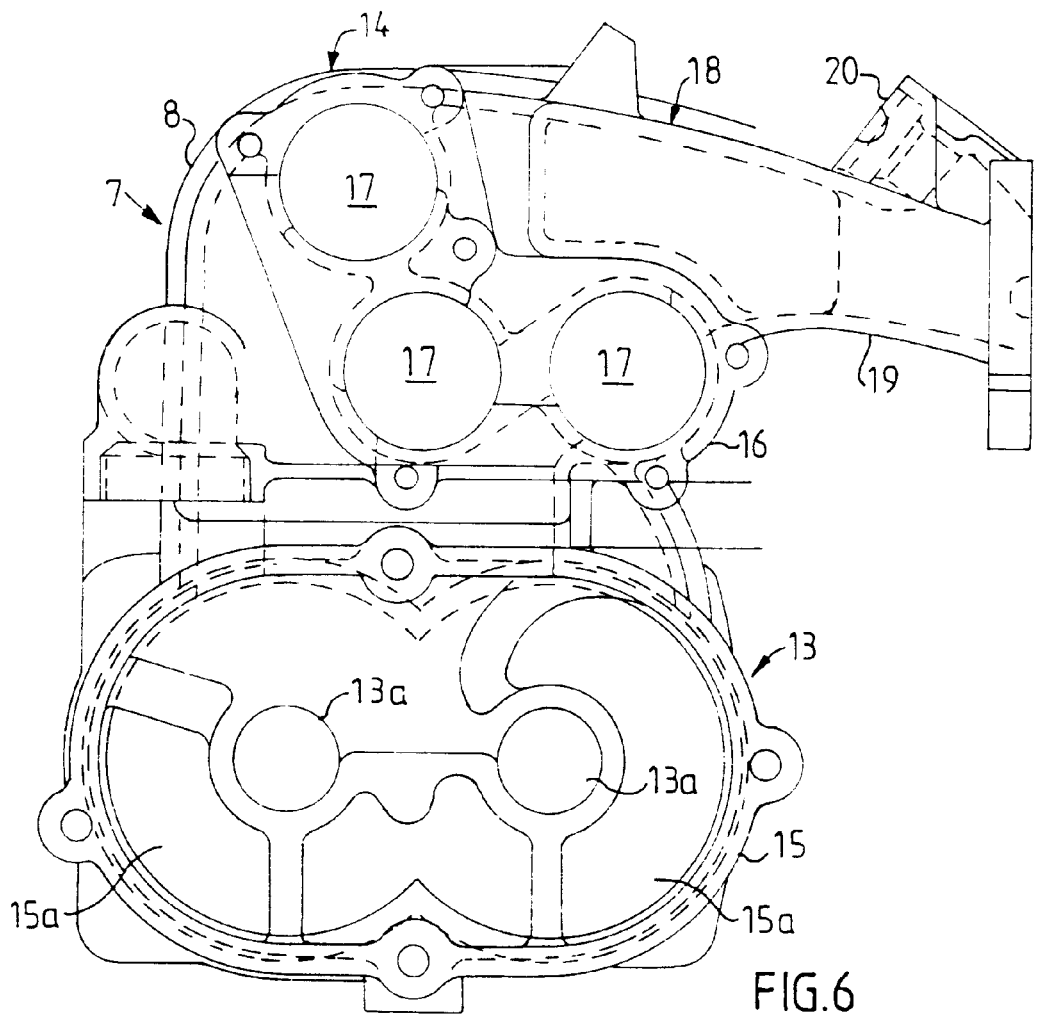
FIG. 6 shows an end perspective view of the unit in FIG. 3 viewed from the right but with its right end removed.
Figure 7:
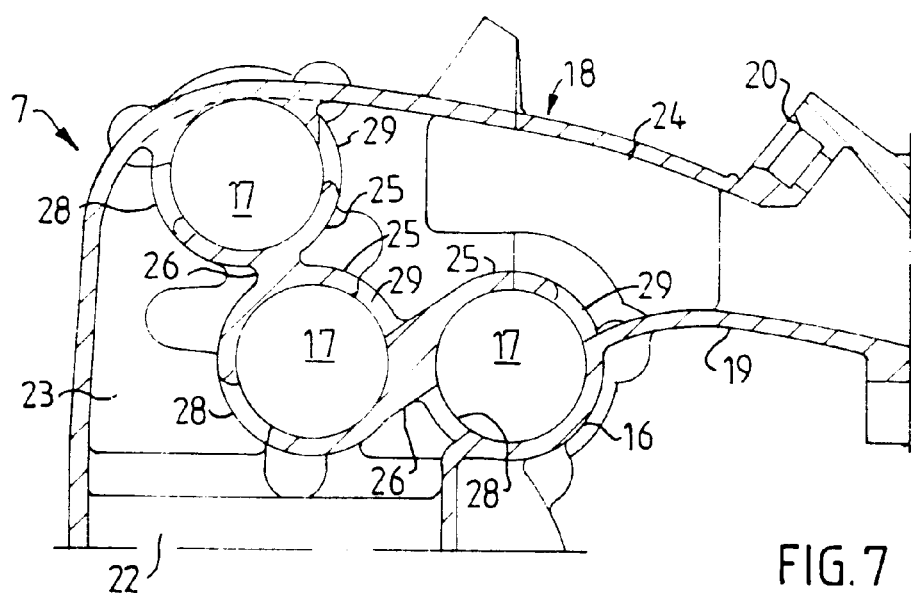
FIG. 7 shows a cross-sectional view through the unit in FIG. 3.

The unit 7 has an integrally cast housing body 8, preferably of aluminum, for housing a screw compressor 13 and an intercooler 14. The housing body 8 is closed at the ends by various end pieces 9, 10 and 11. As illustrated in FIG. 6, a housing part 15 encloses the rotating screws 15a of the compressor 13. The axes 13a of those screws 15a are parallel with the engine crankshaft 6a. An additional housing part 16 defines three cylindrical, elongated chambers parallel to the crankshaft 6a for cooler elements of the intercooler, described in more detail below. The housing part 16 of the intercooler merges into an intake manifold 18 with one or more intake pipes 19, which is therefore integrally cast with the compressor and intercooler housing parts 15 and 16. The intake pipes 19 are preferably designed with threaded seats 20 or like seats 20 for fuel injectors (not shown). Air is drawn into the housing part 15 of the compressor 13 through an inlet pipe 21 connected to a line with an air filter. The compressed air flows through an outlet 22 from the compressor (see, FIG. 7) into an enclosed space 23, which is separated from the interior 24 of the manifold 18 by one or more (here, three) cast-in cylinders 25 with intervening wall elements 26.

The cylinders 25 define the above-mentioned cylindrical chambers 17 and are arranged so that each encloses a cooler element in the form of a pipe with external cooling flanges. In a preferred embodiment, cooling fins 27 of a type known in the art are used, such as shown in FIGS. 8a–8c. Examples of such fins 27 that are commercially available are marketed under the name Laminovastavar. The walls of the cylinders 25 are perforated by slits 28 and 29 distributed along the length of the cylinders. This allows air that is forced into the enclosed space 23 to flow in through the slits 28, pass between cooling gills 30 of the fins 27 and flow out through the slits 29 into the intake manifold 18.

Figure 9:
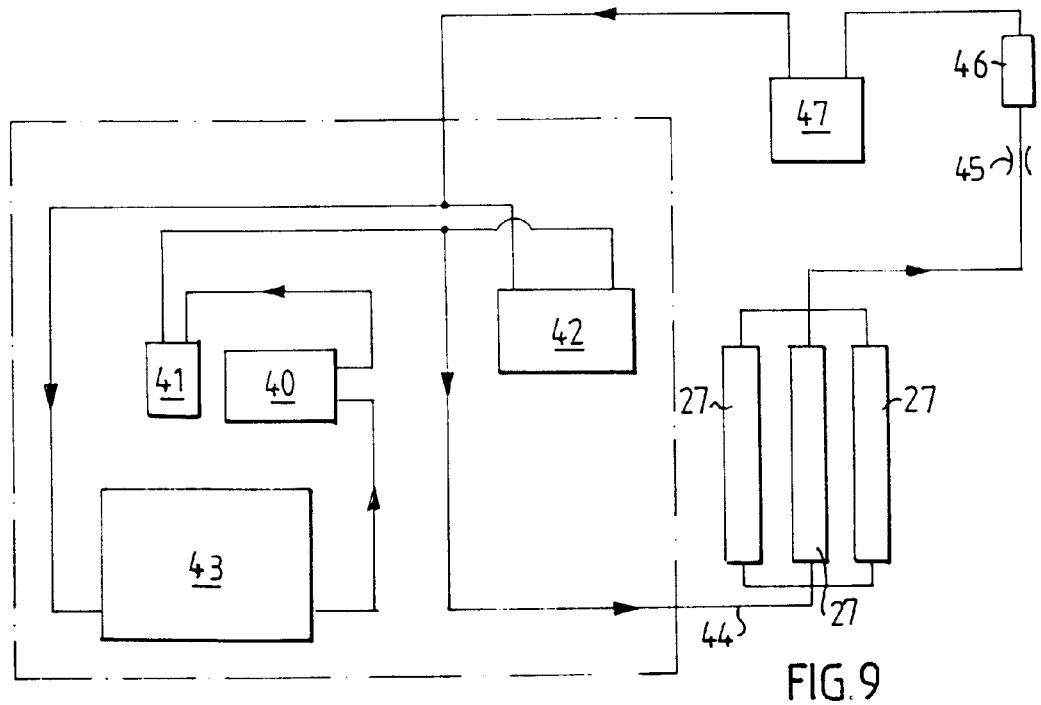
FIG. 9 shows a block diagram or schematic of an exemplary embodiment of a cooling circuit for the intercooler.

In a vehicle with air conditioning system, the refrigerant of the air conditioning system is preferably used for cooling the cooling fins 27. FIG. 9 diagrammatically illustrates such a conventional cooling system having a compressor 40, storage reservoir, 41, cooler element 42 and condenser 43 for cooling the cooling fins. The cooling circuit 44 for the cooling fins 27 is connected in parallel with the cooler element 42. In addition to the fins 27, the circuit 44 comprises a throttle 45, an electrically controlled valve 46 and a storage reservoir 47.

Figure 2:
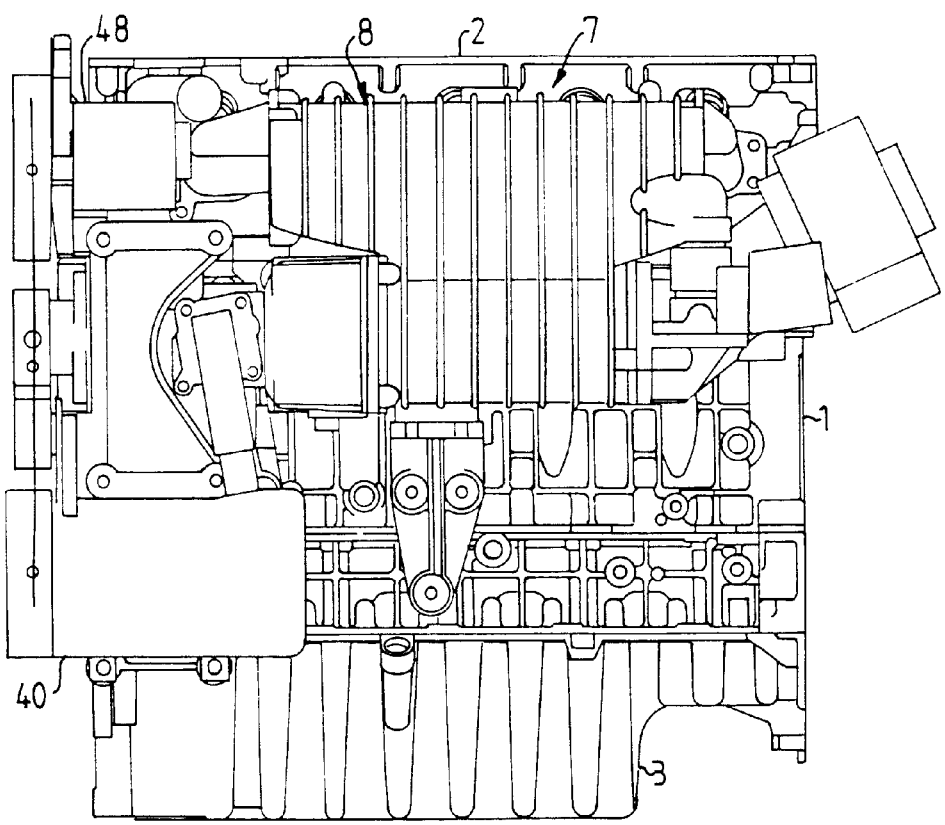
FIG. 2 shows a side perspective view of the engine in FIG. 1.

In the embodiment shown in FIGS. 1 and 2, the air conditioning system cooling compressor 40 is suspended in the housing 8 of the compressor, intercooler and intake manifold unit 7. A power steering hydraulic pump 48 is also fitted in the housing. By suspending the cooling compressor 40 in the housing 8, short lines will suffice for carrying refrigerant to the cooling fins 27 of the intercooler. The embodiment described enables the charge-air compressor 13, the cooling compressor 40 and the hydraulic pump 48 to be driven by the same drive belt from the engine crankshaft, as indicated by the dotted and dashed line 49 in FIG. 1.

Altogether, the embodiment described provides an extremely compact and stable installation that affords very efficient cooling, low noise level and good response.

The invention has been described above with reference to an installation with a screw compressor, but it is also feasible to use other types of mechanically driven compressors, such as a Roots Compressor. Nor is the invention confined to cooling of the cooling fins 27 using the refrigerant in an air conditioning system. Without departing from the scope of the invention, the cooling fins 27 may alternatively be cooled by coolant, which is in turn cooled in an air-cooled heat exchanger.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed is:

1. An internal combustion engine comprising:
   an engine block with a plurality of cylinders,
   a cylinder head connected to the engine block having combustion air inlet ports to each cylinder,
   an intake manifold with at least one branch pipe to each cylinder,
   a mechanically driven compressor connected to the intake manifold by way of an intercooler,
   wherein the compressor and the intercooler have a common housing part made in one piece, the housing part being connected to the intake manifold; and
   wherein the intake manifold is made in one piece with the housing part of the compressor and the intercooler.

2. The internal combustion engine according to claim 1 wherein the compressor is arranged with axes of rotation parallel with an engine crankshaft and that the intercooler has at least one elongated chamber parallel to the axes of rotation of the compressor, said chamber containing a cooler element with a cooling medium flowing through and has an inlet from the compressor and outlet to the intake manifold.

3. The internal combustion engine according to claim 2 wherein the intercooler has a plurality of parallel cylindrical chambers, each comprising a cooler element in a form of a pipe with external cooling flanges and a flow of cooling medium passing through, and having diametrically opposed inlets and outlets for intake air in a cylindrical wall.

4. The internal combustion engine according to claim 2 wherein the cooler element is connected to a refrigerant circuit in an air conditioning system.

5. An internal combustion engine comprising:
   an engine block with a plurality of cylinders,
   a cylinder head connected to the engine block having combustion air inlet ports to each cylinder,
   an intake manifold with at least one branch pipe to each cylinder,
   a mechanically driven compressor connected to the intake manifold by way of an intercooler,
   wherein the compressor and the intercooler have a common housing part made in one piece, the housing part being connected to the intake manifold, and
   wherein the housing part is composed of cast metal.

6. An internal combustion engine comprising:
   an engine block with a plurality of cylinders,
   a cylinder head connected to the engine block having combustion air inlet ports to each cylinder,
   an intake manifold with at least one branch pipe to each cylinder,
   a mechanically driven compressor connected to the intake manifold by way of an intercooler,
   wherein the compressor and the intercooler have a common housing part made in one piece, the housing part being connected to the intake manifold, and
   the common housing part of the compressor and the intercooler further comprising a suspension element for additional units.

7. The internal combustion engine according to claim 6 further comprising an air conditioning system having a refrigerant circuit with a cooling compressor therein and an oil pump for power-assisted steering, the compressor and pump being fitted in the housing part.

8. The internal combustion engine according to claim 6 wherein the compressor and the additional unit(s) are driven by a common belt or chain driven by the engine crankshaft.

9. The internal combustion engine according to claim 6 further comprising an air conditioning system having a refrigerant circuit with a cooling compressor therein, wherein the compressor is fitted in the housing part.

10. The internal combustion engine according to claim 6 further comprising an oil pump for power-assisted steering, wherein the oil pump is fitted in the housing part.

* * * * *